United States Patent
Lee et al.

(10) Patent No.: US 11,444,322 B2
(45) Date of Patent: Sep. 13, 2022

(54) SOLID-STATE POLYMER ELECTROLYTE WITH IMPROVED PROCESSABILITY AND METHOD FOR MANUFACTURING THE SAME

(71) Applicant: KOREA INSTITUTE OF ENERGY RESEARCH, Daejeon (KR)

(72) Inventors: Jung Hyun Lee, Daejeon (KR); Jung Joon Yoo, Daejeon (KR); Jeong Gu Yeo, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 146 days.

(21) Appl. No.: 16/782,074

(22) Filed: Feb. 5, 2020

(65) Prior Publication Data

US 2021/0202989 A1    Jul. 1, 2021

(30) Foreign Application Priority Data

Dec. 27, 2019    (KR) .................. 10-2019-0176007

(51) Int. Cl.
*H01M 10/0565*    (2010.01)

(52) U.S. Cl.
CPC .............. *H01M 10/0565* (2013.01); *H01M 2300/0082* (2013.01)

(58) Field of Classification Search
None
See application file for complete search history.

(56) References Cited

FOREIGN PATENT DOCUMENTS

| KR | 1020190025541 A | | 3/2019 |
| WO | WO 2019/070513 | * | 4/2019 |

OTHER PUBLICATIONS

Strehmel, V. Laschewsky, A., Wetzel, H.-Homopolymerization of a highly polar zwitterionic methacrylate in ionic liquids and its copolymerization with a non-polar methacrylate, e-Polymers 2006, No. 011 (Year: 2006).*
Marzooq, F.-Zwitterion-Containing Ionogel Electrolytes, Tufts University, Aug. 2016 (Year: 2016).*
Morgan, E.T., Panzer, M.J . . . -Fully-Zwitterionic Polymer-Supported Ionogel Electrolytes Featuring a Hydrophobic Ionic Liquid, J. Phys.Chem. B, 2018, 122, 8469-8476 (Year: 2018).*

* cited by examiner

*Primary Examiner* — Anca Eoff
(74) *Attorney, Agent, or Firm* — Cantor Colburn LLP

(57) ABSTRACT

The present disclosure relates to a solid-state polymer electrolyte with improved processability and a method for manufacturing the same, and more particularly to a solid electrolyte containing a polymer obtained by pertaining polymerization of a zwitterionic monomer in a solvent-free ionic liquid.

5 Claims, 6 Drawing Sheets

SOLID-STATE POLYMER ELECTROLYTE WITH IMPROVED PROCESSABILITY AND METHOD FOR MANUFACTURING THE SAME

CROSS-REFERENCE TO RELATED APPLICATION

This application claims the benefit of Korean Patent Application No. 10-2019-0176007, filed on Dec. 27, 2019 in the Korean Intellectual Property Office, under 35 U.S.C. § 119, the content of which in its entirety is incorporated herein by reference.

BACKGROUND

1. Technical Field

The present disclosure relates to a solid-state polymer electrolyte with improved processability and a method for manufacturing the same, and more particularly to a solid electrolyte containing a polymer obtained by performing polymerization of a zwitterionic monomer in a solvent-free ionic liquid.

2. Description of the Related Art

A supercapacitor is a device that uses the storage of charge in the electric double layer between a solid electrode and an electrolyte. The supercapacitor has a lower energy density than existing batteries, but has excellent characteristics in terms of power density for instantaneous energy supply and has a semi-permanent lifespan. Thus, the supercapacitor is expected to be applied as an ultra-high capacity battery in various fields. In particular, the supercapacitor has been actively applied for load leveling in combination with a secondary battery as an auxiliary power source for an environmentally friendly hybrid electric vehicle.

The supercapacitor shows a weight energy density equal to ½ to 1/10 of that of a secondary battery depending on the characteristics of the electrode active material, and the power density indicating the charge/discharge ability thereof is at least about 100-fold higher than that of the secondary battery.

The supercapacitor includes electrodes (positive electrode and negative electrode), an electrolyte, a separator, a current collector, a case, a terminal, and the like. When a pair of solid electrodes is placed in an electrolyte ion solution and a direct voltage is applied across the electrodes, an anion is electrostatically attracted to the positively charged electrode, and a cation is electrostatically attracted to the negatively charged electrode, so that an electric double layer is formed at the interface between the electrode and the electrolyte. In particular, when activated carbon is used as an electrode, a large number of micropores are distributed, and hence the area the electric double layer area can be widened, thereby achieving high capacitance. In this case, the electrolyte plays an important role together with the electrode, and the electrolyte directly contains ions that form the electric double layer.

Meanwhile, the electrolyte that is used in the supercapacitor is largely divided into an aqueous electrolyte and an organic electrolyte. The aqueous electrolyte has the advantage of having high ionic conductivity, but it contains water as a solvent, and hence is electrochemically stable only when it is used below 1.24 V, which is the decomposition voltage of water. For this reason, the aqueous electrolyte has a narrow operating voltage range, and thus has a limitation in fabricating a supercapacitor having high energy density. On the other hand, the organic electrolyte has a disadvantage in that the low ion conductivity thereof is lower than that of the aqueous electrolyte. However, the organic electrolyte has an advantage in that the voltage window thereof is wide because the organic solvent itself is electrochemically stable. Thus, the organic electrolyte has the advantage of making it possible to fabricate a supercapacitor having high energy density. Representative examples of the organic electrolyte include acetonitrile (ACN) containing a quaternary ammonium salt, or propylene carbonate (PC).

Normally, liquid electrolytes have the advantage of having higher ionic conductivity than solid or gel electrolytes. However, most of the electrolytes studied so far have a fundamental disadvantage in that vaporization still occur at room temperature due to the vapor pressure of the solvent. In addition, liquid electrolytes have weaknesses in terms of leakage, deterioration of life characteristics during charging and discharging, and securing safety against overcharge and misuse, and are disadvantageous in term of the flexibility of design and shape of supercapacitors.

Accordingly, the present inventors have conducted studies to solve the above-described problems, and as a result, have developed a solid electrolyte containing a polymer obtained by performing polymerization of a zwitterionic monomer in a solvent-free ionic liquid, and have found the applicability of the solid electrolyte to supercapacitors or secondary batteries, thereby completing the present disclosure.

In connection with this, Korean Patent Application Laid-Open No. 10-2019-0025541 discloses a separator for an electrochemical device, a method for manufacturing the same, and the use thereof.

SUMMARY

Accordingly, the present disclosure has been conceived to solve the above-described problems, and one embodiment of the present disclosure provides a method for manufacturing a solid electrolyte, the method being characterized by performing polymerization of a zwitterionic monomer in a solvent-free ionic liquid.

Another embodiment of the present disclosure provides a solid electrode containing a polymer obtained by polymerization of a zwitterionic monomer in a solvent-free ionic liquid.

Still another embodiment of the present disclosure provides a supercapacitor or secondary battery including the solid electrolyte.

The technical objects to be achieved by the present disclosure are not limited to the above-mentioned objects, and other technical problems which are not mentioned will be clearly understood by those skilled in the art from the following description.

To achieve the above objects, one aspect of the present disclosure provides a method for manufacturing a solid electrolyte, the method including the steps of: mixing a zwitterionic monomer and an ionic liquid; and performing polymerization of the zwitterionic monomer in the ionic liquid.

No solvent may be added in the step of mixing the zwitterionic monomer and the ionic liquid.

The zwitterionic monomer may include, as a cationic group, an ammonium group, a pyridinium group or an imidazolium group, and as an anionic group, a carboxylate group, a phosphate group or a sulfonate group.

The zwitterionic monomer may be one or more compounds selected from the group consisting of compounds represented by the following Formulas 1 to 3, respectively:

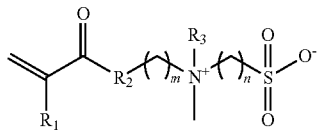

[Formula 1]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl;

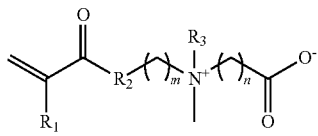

[Formula 2]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl;

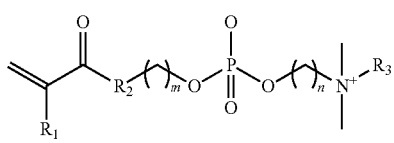

[Formula 3]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl.

In Formulas 1 to 3 above, m and n may be each an integer ranging from 1 to 5, $R_1$ may be hydrogen, a linear or branched $C_1$-$C_5$ alkyl, or a linear or branched $C_2$-$C_5$ alkenyl, and $R_3$ may be a linear or branched $C_1$-$C_5$ alkyl, or a linear or branched $C_2$-$C_5$ alkenyl.

The zwitterionic monomer may include a monomer selected from the group consisting of sulfobetaine methacrylate (SBMA), carboxybetaine methacrylate (CBMA), carboxybetaine acrylamide (CBAA), 2-methacryloyloxyethyl phosphorylcholine (MPC), and combinations thereof.

The ionic liquid may contain an anion, and the anion may selected from the group consisting of trifluoroacetate ($[tfa]^-$), trifluoromethanesulfonate ($[CF_3SO_3]^-$), bis(fluorosulfonyl)imide ($[N(SO_2F)_2]^-$), bis(trifluoromethanesulfonyl)imide ($[N(SO_2CF_3)_2]^-$), dicyanamide ($[N(CN)_2]^-$), tetracyanoborate ($[B(CN)_4]^-$), dihydrogenphosphate ($[H_2PO_4]^-$), hydrogen sulfate ($[HSO_4]^-$), and combinations thereof.

The ionic liquid may contain a cation, and the cation may include a cation selected from the group consisting of imidazolium, pyrrolidinium, piperidinium alkylmethylimidazolium, and combinations thereof.

The ionic liquid may consist of a cation and an anion selected from the group described above. For example, typical ionic liquid can be 1-ethyl-3-methylimidazolium bis(trifluoromethylsulfonyl)imide, 1 methyl-3-propylimidazolium iodide, 1-ethyl-3-methylimidazolium tetrafluoroborate, 1-ethyl-3-methylimidazolium trifluoromethanesulfonate, 1 ethyl-3-methylimidazolium hydrogensulfate, N-methyl-N-butylpyrrolidinium bis(trifluoromethanesulfonyl)imide, or a combination, and combinations thereof.

The zwitterionic monomer and the ionic liquid may be mixed at a weight ratio of 1:0.3 to 2.

The method for manufacturing the solid electrolyte may further include, after the step of mixing the zwitterionic monomer and the ionic monomer, a step of applying the mixed zwitterionic monomer and ionic liquid to an object.

Another aspect of the present disclosure provides a solid electrolyte including: a polymer obtained by polymerization of a zwitterionic monomer; and an ionic liquid, the solid electrolyte including no solvent.

Still another aspect of the present disclosure provides a supercapacitor or secondary battery including the solid electrolyte.

DETAILED DESCRIPTION

Figure 1:
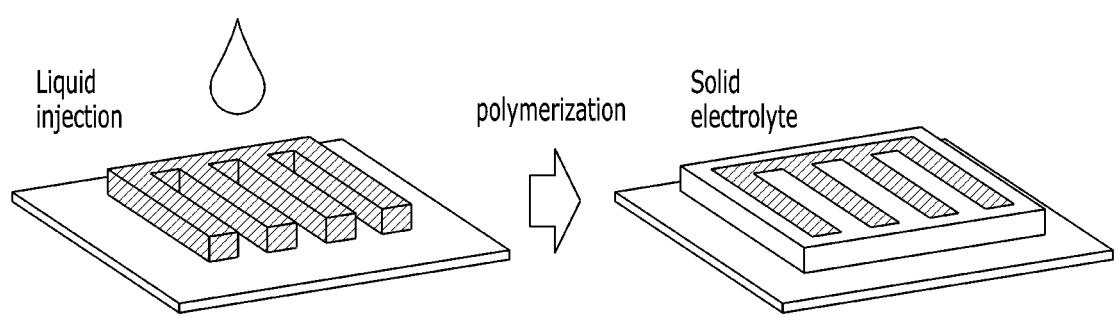
FIG. 1 is a schematic view illustrating a 3D printing process of introducing a solid electrolyte into a 3D electrode according to one embodiment of the present disclosure.

Hereinafter, the present disclosure will be described in more detail. However, the present disclosure may be embodied in various different forms, and the scope of the present disclosure is not limited to the embodiments described herein, and shall be defined only by the appended claims.

In addition, terms used in the present disclosure are only to describe specific embodiments and are not intended to limit the scope of the present disclosure. Singular expressions include plural expressions unless otherwise specified in the context thereof.

Throughout the present specification, it is to be understood that when any part is referred to as "including" any component, it does not exclude other components, but may further include other components, unless otherwise specified.

A first aspect of the present disclosure provides a method for manufacturing a solid electrolyte, the method including the steps of: mixing a zwitterionic monomer and an ionic liquid; and performing polymerization of the zwitterionic monomer in the ionic liquid.

Hereinafter, each step of the method for manufacturing a solid electrolyte according to the first aspect of the present disclosure will be described in detail.

In one embodiment of the present disclosure, the method for manufacturing a solid electrolyte includes a step of mixing a zwitterionic monomer and an ionic liquid.

In one embodiment of the present disclosure, the mixing is performed to prepare a homogeneous solution by stirring the zwitterionic monomer and the ionic liquid, and the appropriate mixing temperature and mixing time may differ depending on the kind of zwitterionic monomer and the kind of ionic liquid. Specifically, the mixing time may be sufficient if the zwitterionic monomer in powder form is sufficiently dissolved in the ionic liquid and becomes homogeneous with the ionic liquid. Meanwhile, when the zwitterionic monomer is present in a liquid state rather than in powder or solid form, the mixing or stirring time may be further shortened. In addition, the mixing may be performed at room temperature, and in some cases, the mixing temperature may be increased to a temperature of 30° C. to 70° C. in order to improve solubility, but is not limited thereto.

In one embodiment of the present disclosure, a solvent, particularly water, may not be added in the step of mixing the zwitterionic monomer and the ionic monomer. That is, in the step of performing polymerization of the zwitterionic monomer as described later, the polymerization is performed only in the ionic liquid, and thus the manufactured solid electrolyte may have high resistance to water. Therefore, the solid electrolyte may have a wide voltage window of 1.24 V or higher.

In one embodiment of the present disclosure, the zwitterionic monomer may include, as a cationic group, an ammonium group, a pyridinium group or an imidazolium group, and as an anionic group, a carboxylate group, a phosphate group or a sulfonate group.

Specifically, the zwitterionic monomer may be one or more compounds selected from the group consisting of compounds represented by the following Formulas 1 to 3, respectively:

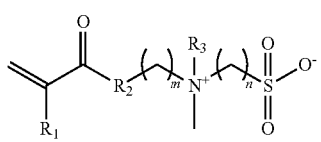

[Formula 1]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl;

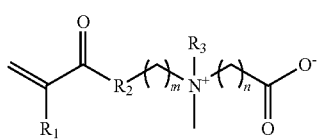

[Formula 2]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl;

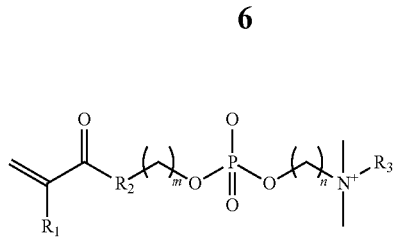

[Formula 3]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl.

Preferably, in Formulas 1 to 3 above, m and n may be each an integer ranging from 1 to 5, $R_1$ may be hydrogen, a linear or branched $C_1$-$C_5$ alkyl, or a linear or branched $C_2$-$C_5$ alkenyl, and $R_3$ may be a linear or branched $C_1$-$C_5$ alkyl, or a linear or branched $C_2$-$C_5$ alkenyl. More preferably, the zwitterionic monomer may include a monomer selected from the group consisting of sulfobetaine methacrylate (SBMA), carboxybetaine methacrylate (CBMA), carboxybetaine acrylamide (CBAA), 2-methacryloyloxyethyl phosphorylcholine (MPC), and combinations thereof.

In one embodiment of the present disclosure, the ionic liquid may mean a liquid composed of an anion and a cation.

In one embodiment of the present disclosure, the anion may include an anion selected from the group consisting of trifluoroacetate ([tfa]$^-$), trifluoromethanesulfonate ([$CF_3SO_3$]$^-$), bis(fluorosulfonyl)imide ([$N(SO_2F)_2$]$^-$), bis(trifluoromethanesulfonyl)imide ([$N(SO_2CF_3)_2$]$^-$), dicyanamide ([$N(CN)_2$]$^-$), tetracyanoborate ([$B(CN)_4$]$^-$), dihydrogenphosphate ([$H_2PO_4$]$^-$), hydrogen sulfate ([$HSO_4$]$^-$), and combinations thereof.

In one embodiment of the present disclosure, the cation may include a cation selected from the group consisting of imidazolium, pyrrolidinium, piperidinium alkylmethylimidazolium, and combinations thereof.

In one embodiment of the present disclosure, the ionic liquid may include a cation and an anion selected from the group described above, for example 1-ethyl-3-methylimidazolium bis(trifluoromethylsulfonyl)imide, 1 methyl-3-propylimidazolium iodide, 1-ethyl-3-methylimidazolium tetrafluoroborate, 1-ethyl-3-methylimidazolium trifluoromethanesulfonate, 1 ethyl-3-methylimidazolium hydrogensulfate, N-methyl-N-butylpyrrolidinium bis(trifluoromethanesulfonyl)imide, or a combination thereof.

In one embodiment of the present disclosure, the step of mixing the zwitterion monomer and the ionic liquid may further include mixing a photoinitiator in addition to the above substances. In this case, the kind of photoinitiator is not particularly limited as long as it is an initiator for crosslinking the zwitterionic monomer. The photoinitiator that is used in the present disclosure may be a known photoinitiator. Meanwhile, the zwitterionic monomer and the ionic liquid may be mixed at a weight ratio of 1:0.3 to 2, preferably 1:0.5 to 1.5. If the mixing weight ratio of the ionic liquid to the zwitterionic monomer is less than 0.3, the content of the ionic liquid is relatively low, and hence the zwitterionic monomer and the photoinitiator will not be easily dissolved in the ionic liquid, making it impossible to form a homogeneous phase, resulting in deterioration of the electrical performance of the resulting solid electrolyte. On the other hand, if the mixing weight ratio of the ionic liquid to the zwitterionic monomer is more than 2, the content of the ionic liquid is relatively high and excessive, and hence a problem may arise in that the solid electrolyte manufactured after subsequent polymerization is not kept in a solid state or the mechanical strength of the electrolyte decreases. Meanwhile, the mixing weight ratio of the photoinitiator may be 0.05 parts by 1 part by weight based on 100 parts by weight of the zwitterionic monomer. If the mixing weight ratio of the photoinitiator is less than 0.05 parts by weight, the content of the photoinitiator is excessively low, and hence subsequent polymerization of the zwitterionic monomer may not be easily carried out, and if the mixing weight ratio of the photoinitiator is more than 1 part by weight, the content of the photoinitiator is excessively high, and hence a problem may arise in that the photoinitiator remains unreacted after polymerization of the zwitterionic monomer.

In one embodiment of the present disclosure, the method for manufacturing a solid electrolyte includes, after the mixing step, a step of performing polymerization of the zwitterionic monomer in the ionic liquid. In one embodiment of the present disclosure, the polymerization may be performed by irradiating the mixture of the zwitterionic monomer and the ionic liquid with UV light. That is, when the mixture is irradiated with UV light, the zwitterionic monomer contained in the mixture may be crosslinked and polymerized in the ionic liquid. Meanwhile, the method for manufacturing a solid electrolyte may further include, before the step of performing the polymerization, a step of applying the mixture of the zwitterionic monomer and the ionic liquid to an object. In this case, the object is an object for supporting the shape of the solid electrolyte, and may refer to, for example, a mold or an electrode shape. The mold or electrode shape may have a complex shape, and since the mixture is in a liquid state, it may be easily applied even when the object has a complex shape. That is, since the solid electrolyte is manufactured by applying the liquid-state mixture to an object having a complex shape, and then performing polymerization, the object may be easily controlled such that the manufactured solid electrolyte has a desired shape. In this case, the application of the mixture may be performed using various methods, including spraying, spin coating, screen coating, and dropping, and may include a process of controlling the temperature of the temperature to control the viscosity of the solution.

A second aspect of the present disclosure provides a solid electrolyte including: a polymer obtained by polymerization of a zwitterionic monomer; and an ionic liquid, the solid electrolyte including no solvent.

Although the detailed description of portions overlapping with the first aspect of the present disclosure is omitted, the description of the first aspect of the present disclosure may be equally applied to the second aspect even if the description is omitted in the second aspect.

Hereinafter, the solid electrolyte according to the second aspect of the present disclosure will be described in detail.

In one embodiment of the present disclosure, the solid electrolyte may not include a solvent, particularly water. That is, since the solid electrolyte includes a polymer obtained by performing polymerization of the zwitterionic monomer only in the ionic liquid, it may have high resistance to water. Thus, the solid electrolyte may have a wide voltage window of 1.24 V or higher.

In one embodiment of the present disclosure, the zwitterionic monomer may include, as a cationic group, an ammonium group, a pyridinium group or an imidazolium group, and as an anionic group, a carboxylate group, a phosphate group or a sulfonate group. Specifically, the zwitterionic monomer may be one or more compounds selected from the group consisting of compounds represented by the following Formulas 1 to 3, respectively:

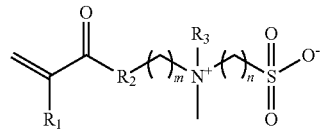

[Formula 1]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl;

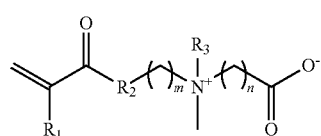

[Formula 2]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl;

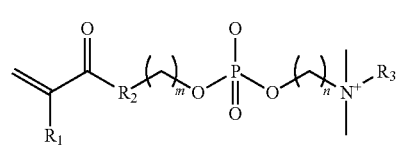

[Formula 3]

wherein m and n are each an integer ranging from 1 to 10; $R_1$ is hydrogen, a linear or branched $C_1$-$C_{10}$ alkyl, or a linear or branched $C_2$-$C_{10}$ alkenyl; $R_2$ is nitrogen or oxygen; and $R_3$ is a linear or branched $C_1$-$C_{10}$ alkyl, or a linear or branched $C_2$-$C_{10}$ alkenyl.

Preferably, in Formulas 1 to 3 above, m and n may be each an integer ranging from 1 to 5, $R_1$ may be hydrogen, a linear or branched $C_1$-$C_5$ alkyl, or a linear or branched $C_2$-$C_5$ alkenyl, ands $R_3$ may be a linear or branched $C_1$-$C_5$ alkyl, or a linear or branched $C_2$-$C_5$ alkenyl. More preferably, the zwitterionic monomer may include a monomer selected from the group consisting of sulfobetaine methacrylate (SBMA), carboxybetaine methacrylate (CBMA), carboxybetaine acrylamide (CBAA), 2-methacryloyloxyethyl phosphorylcholine (MPC), and combinations thereof.

In one embodiment of the present disclosure, the ionic liquid may mean a liquid composed of an anion and a cation.

The specific types of anion and cation are described in the first aspect of the present disclosure, and thus the description thereof will be omitted in the second aspect of the present disclosure.

In one embodiment of the present disclosure, the content of the ionic liquid may be 30 parts by weight to 200 parts by weight based on 100 parts by weight of the polymer obtained by polymerization of the zwitterionic monomer. If the content of the ionic liquid is less than 30 parts by weight, the content of the ionic liquid is excessively low, and hence a problem may arise in that the electrochemical performance of the solid electrolyte may be deteriorated, and if the content of the ionic liquid is more than 200, the content of the ionic liquid is excessively high, and hence a problem may arise in that the solid electrolyte is not kept in a solid state or the mechanical strength of the solid electrolyte decreases.

In one embodiment of the present disclosure, the solid electrolyte may be used as an electrolyte for an energy storage device, for example, a supercapacitor or a secondary battery. In particular, since the solid electrolyte is manufactured by polymerization from the mixture of the zwitterionic monomer and the ionic liquid, it may be used as an electrolyte for a supercapacitor or secondary battery having an electrode of complex shape. FIG. 1 is a schematic view illustrating a 3D printing process for the solid electrolyte. Referring to FIG. 1, the mixture of the zwitterionic monomer and the ionic liquid is injected into a 3D electrode having prominences and depressions, and then subjected to polymerization, thereby manufacturing a solid electrolyte. Thus, it can be seen that a compact solid electrolyte may be manufactured in the electrode. However, since the schematic diagram shown in FIG. 1 is in accordance with one embodiment of the present application, the shape of the electrode and the shape of the solid electrolyte are not limited thereto, electrodes and solid electrolytes having various shapes may be possible. Meanwhile, since the solid electrolyte is in a solid state, it may be prevented from leakage, and may have excellent flexibility and stretchability. In addition, since the solid electrolyte is manufactured without using water, a supercapacitor or secondary battery including the same may have a wide voltage window of 1.24 V or higher, preferably 3 V or higher, and may have high capacitance.

Hereinafter, examples of the present disclosure will be described in detail so that those skilled in the art to which the present disclosure pertains can easily carry out the present disclosure. However, the present disclosure may be embodied in various different forms and is not limited to the examples described herein.

Example: Fabrication of Supercapacitor

1. Manufacture of Solid Electrolyte for Supercapacitor

Figure 2A:
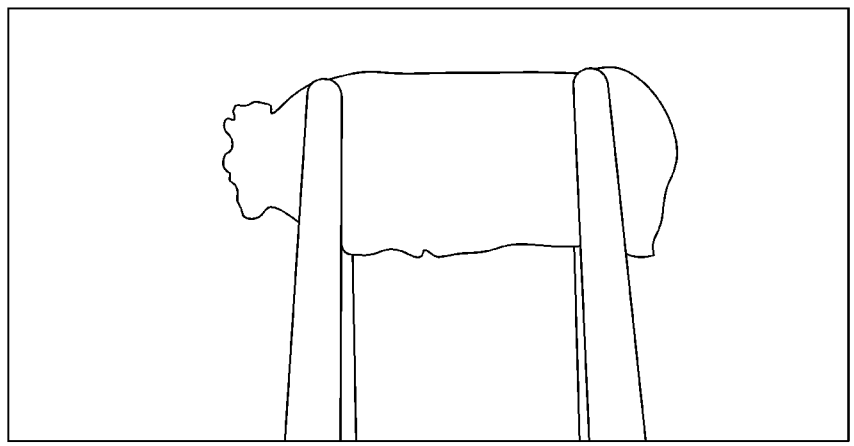
FIG. 2A and FIG. 2B depicts photographs respectively showing before stretching and after stretching of a solid electrolyte manufactured according to one embodiment of the present disclosure.
Figure 2B:
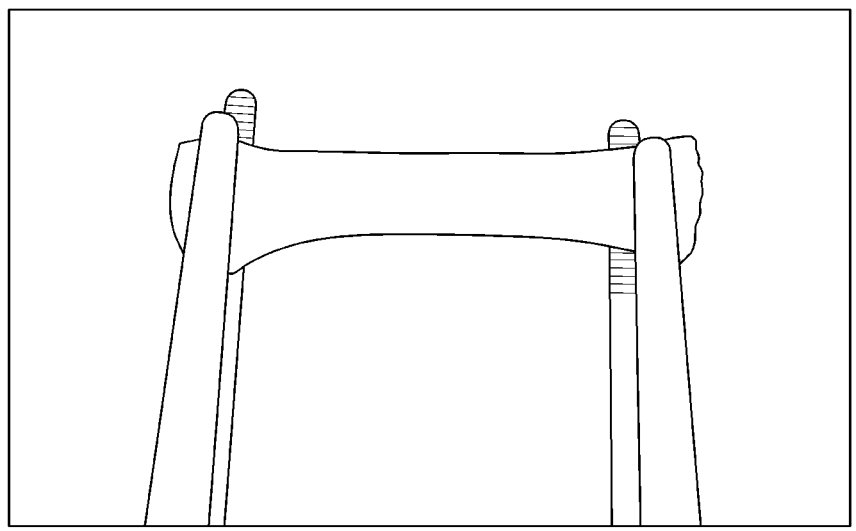

First, in order to manufacture a solid electrolyte for a supercapacitor, sulfobetaine methacrylate (SBMA) as a zwitterionic monomer and 1-ethyl-3-methylimidazolium bis(trifluoromethylsulfonyl)imide as an ionic liquid were mixed at a weight ratio of 1:0.5 at room temperature. Next, the zwitterionic monomer was subjected to polymerization by irradiating the mixture with UV light, thereby manufacturing a solid electrolyte. FIGS. 2A and 2B, respectively, show photographs before and after stretching of the solid electrolyte manufactured as described above. It was confirmed that the solid electrolyte had excellent flexibility and stretchability.

2. Fabrication of Supercapacitor Including Solid Electrolyte

A supercapacitor including the solid electrolyte manufactured in the above section 1 was fabricated using an Al foil as a current collector and activated carbon as an electrode.

Test Example: Analysis of Electrochemical Characteristics of Supercapacitor

Figure 3:
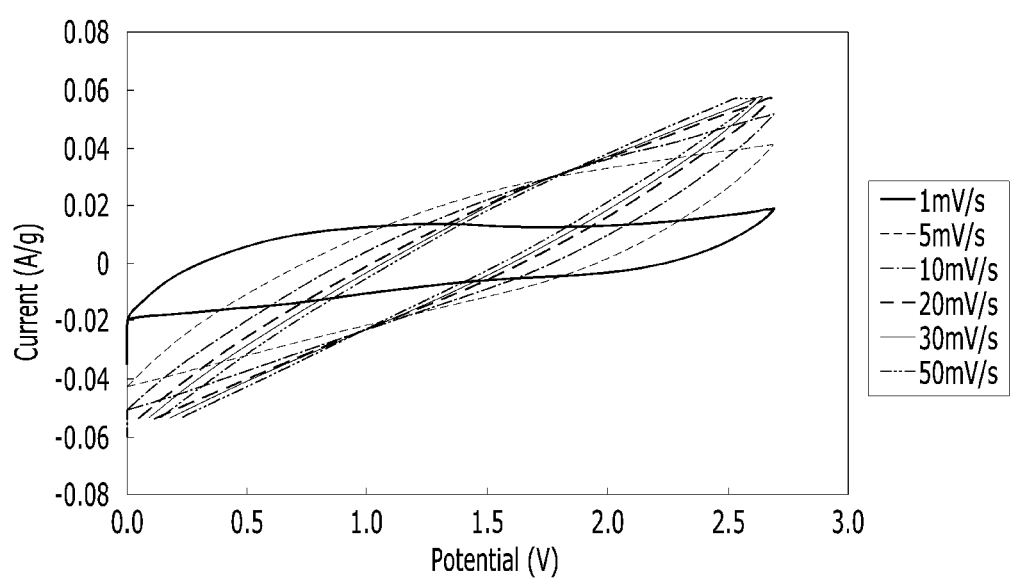
FIG. 3 is a graph showing the CV curve of a supercapacitor including a solid electrolyte according to one embodiment of the present disclosure.
Figure 4:
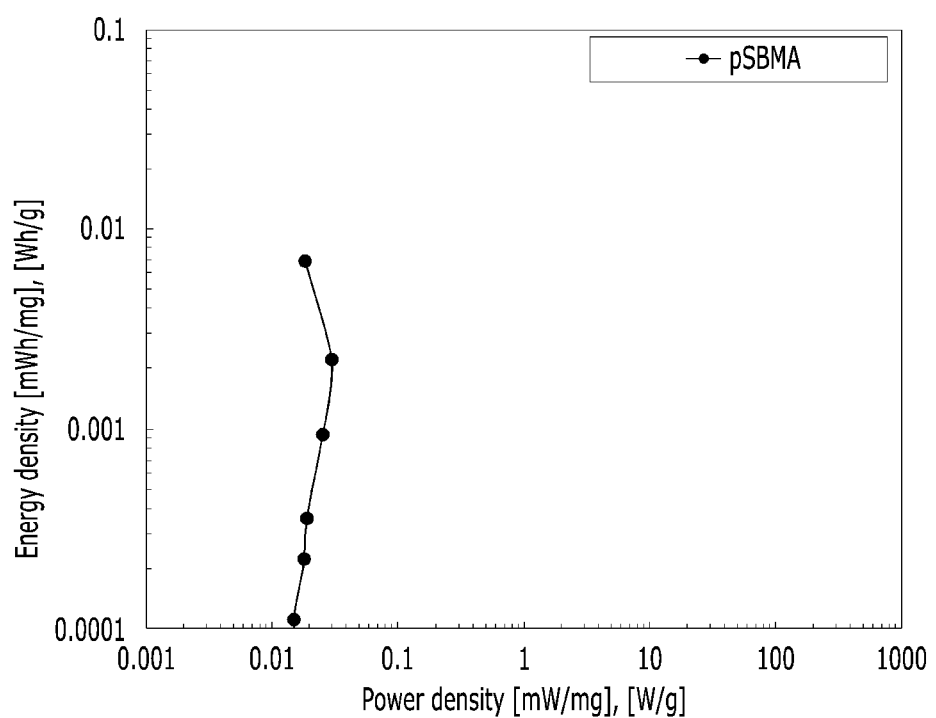
FIG. 4 is a graph showing the energy density versus the powder density of a supercapacitor including a solid electrolyte according to one embodiment of the present disclosure.
Figure 5:
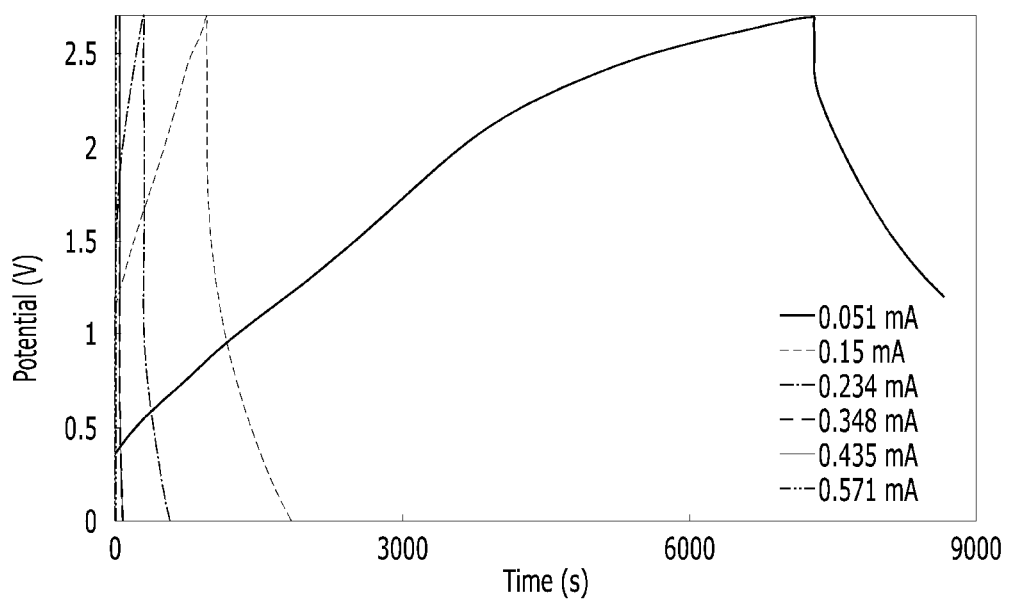
FIG. 5 is a graph showing the charge and discharge test results of a supercapacitor including a solid electrolyte according to an embodiment of the present disclosure.

The electrochemical characteristic of the supercapacitor fabricated in the above Example, and the results of the analysis are shown in FIGS. 3 to 5 and Table 1 below.

| Separator | Scan rate (mV/s) | Capacitance (mF) | Energy density (mWh/g) | Power density (mW/g) |
|---|---|---|---|---|
| | 1 | 49.33 | 7 | 18 |
| | 10 | 6.71 | 1 | 25 |

As shown in Table 1 above and FIG. 4, it could be confirmed that the supercapacitor fabricated in the Example exhibited excellent capacitance, energy density and power density.

In addition, as shown in FIGS. 3 and 5, it could be confirmed that the supercapacitor fabricated in the Example had a wide voltage window of about 2.7 V.

As described above, according to one embodiment of the present disclosure, since the solid electrolyte is manufactured in the ionic liquid without using a solvent, particularly water, in the step of performing polymerization of the zwitterionic monomer, it may be easily synthesized and may have high resistance to water. Specifically, since water is electrolyzed at 1.24 V or higher, an electrolyte, which is one component of a supercapacitor or a secondary battery, may not be operated at a high voltage if the electrolyte contains water or a hydrophilic solvent. On the other hand, when an organic solid electrolyte is used, it may have a wide voltage window of 1.24 V or higher. Therefore, the supercapacitor or secondary battery of the present disclosure, which includes the organic solid electrolyte having high resistance to water, may have a wide voltage window, and thus have higher capacitance.

According to one embodiment of the present disclosure, the solid electrolyte may have excellent flexibility and stretchability, and may have high ion conductivity.

According to one embodiment of the present disclosure, since the solid electrolyte is manufactured by polymerization in a liquid state, it may be used even for an electrode having a complex structure, and may be prevented from leakage. Meanwhile, the viscosity of the solid electrolyte may be controlled by controlling the content of the ionic liquid. That is, when the viscosity of the electrolyte is high, the risk of leakage of the electrolyte from a fabricated capacitor or secondary battery cell may be reduced, and when the viscosity of the electrolyte is low, the electrolyte may easily penetrate into a porous electrode material, so that the interfacial resistance in the cell may be reduced. Therefore, the solid electrolyte developed in the present disclosure may simultaneously achieve electrolyte penetration into a porous electrode as well as the effect of preventing leakage of the electrolyte by controlling the content of the ionic liquid. In addition, it is possible to manufacture an electrolyte ink for 3D printing by controlling the viscosity of the electrolyte to a suitable level, and it is possible to inject the electrolyte by a printing process depending on the electrode pattern patterned to have a complex shape. Thus, ultimately, it may be possible to fabricate a supercapacitor or a secondary battery through an all-printing process.

According to another embodiment of the present disclosure, since the solid electrolyte has excellent thermal stability, the operating temperature range thereof may be wider than that of an electrolyte manufactured using an organic solvent or water as a solvent.

It is to be understood that the effects of the present disclosure are not limited to the above-described effects and include all effects that can be deduced from the configuration of the present disclosure described in the detailed description of the disclosure or the claims.

Although the specific embodiments of the present disclosure have been disclosed for illustrative purposes, those skilled in the art will appreciate that various modifications, additions and substitutions are possible without departing from the scope and spirit of the disclosure as disclosed in the accompanying claims.

What is claimed is:

1. A method for manufacturing a solid electrolyte, the method comprising:
    mixing sulfobetaine methacrylate with an ionic liquid; and
    polymerizing the sulfobetaine methacrylate in the ionic liquid; wherein the sulfobetaine methacrylate and the ionic liquid are mixed at a weight ratio of 1:0.3 to 1:2,
    wherein the ionic liquid is 1-ethyl-3-methylimidazolium bis(trifluoromethylsulfonyl)imide.

2. The method of claim 1, wherein no solvent is added in the mixing the sulfobetaine methacrylate and the ionic liquid.

3. The method of claim 1, further comprising applying the mixed sulfobetaine methacrylate and ionic liquid to an object prior to the polymerizing of the mixture.

4. A solid electrolyte comprising
    a polymer obtained by a polymerization of a sulfobetaine methacrylate and an ionic liquid in the absence of solvent, wherein a weight ratio of the polymer to the ionic liquid is 1:0.3 to 1:2, and there is no solvent in the solid electrolyte, and the solid electrolyte is present in a supercapacitor; and
    wherein the ionic liquid is 1-ethyl-3-methylimidazolium bis(trifluoromethylsulfonyl)imide.

5. A supercapacitor comprising the solid electrolyte of claim 4.

* * * * *